April 22, 1952  W. E. RYAN  2,594,221
BALE LOADER
Filed Feb. 21, 1950  4 Sheets-Sheet 1
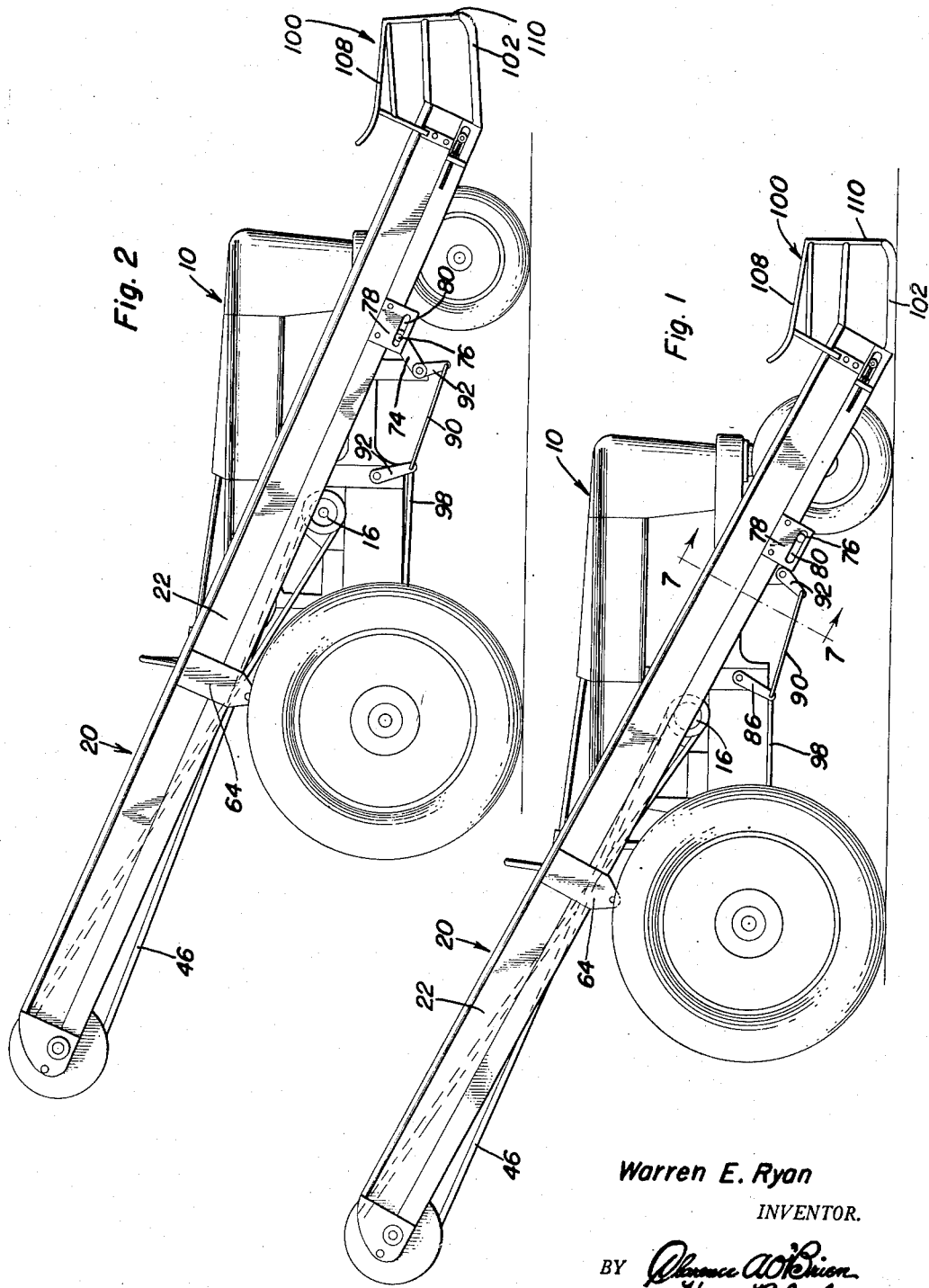
Warren E. Ryan
INVENTOR.
BY *Clarence A. O'Brien*
*and Harvey B. Jacobson*
Attorneys

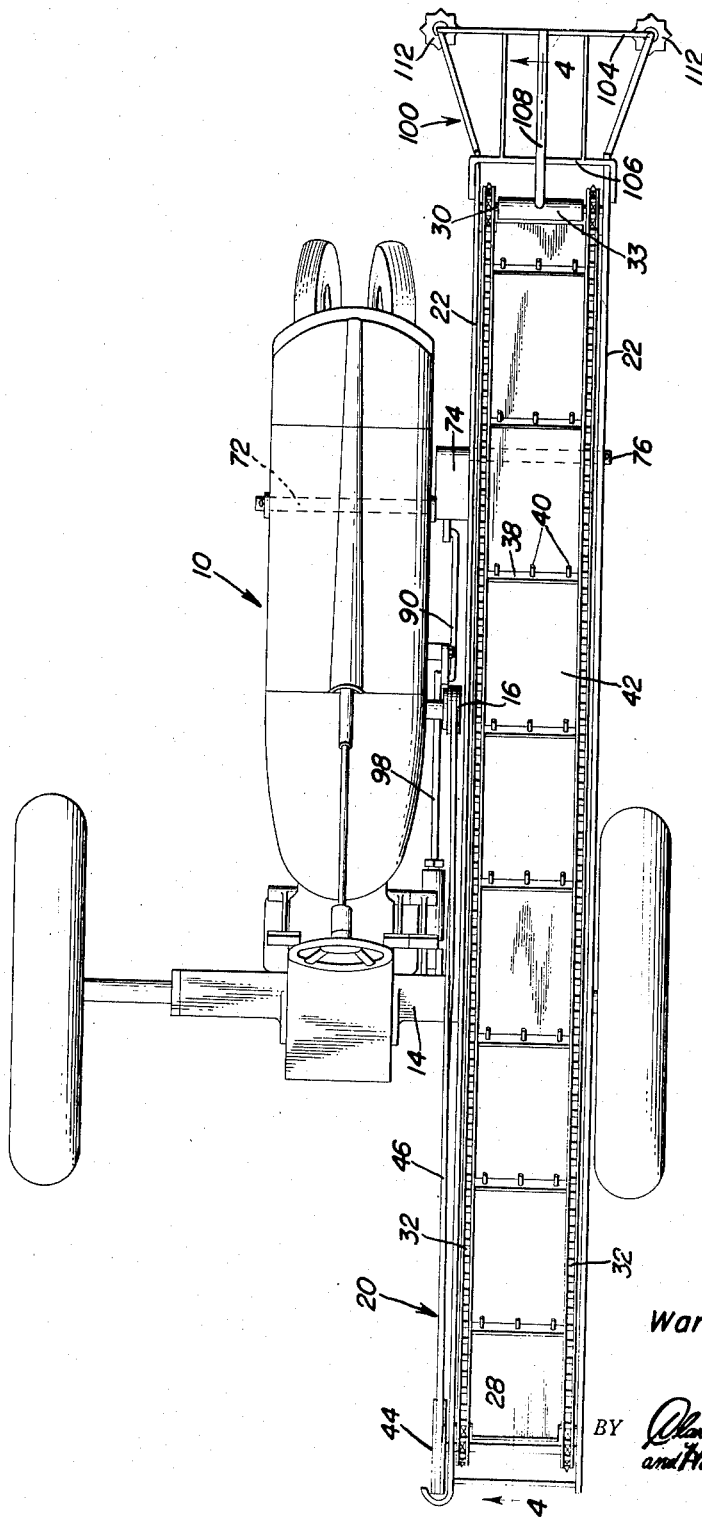

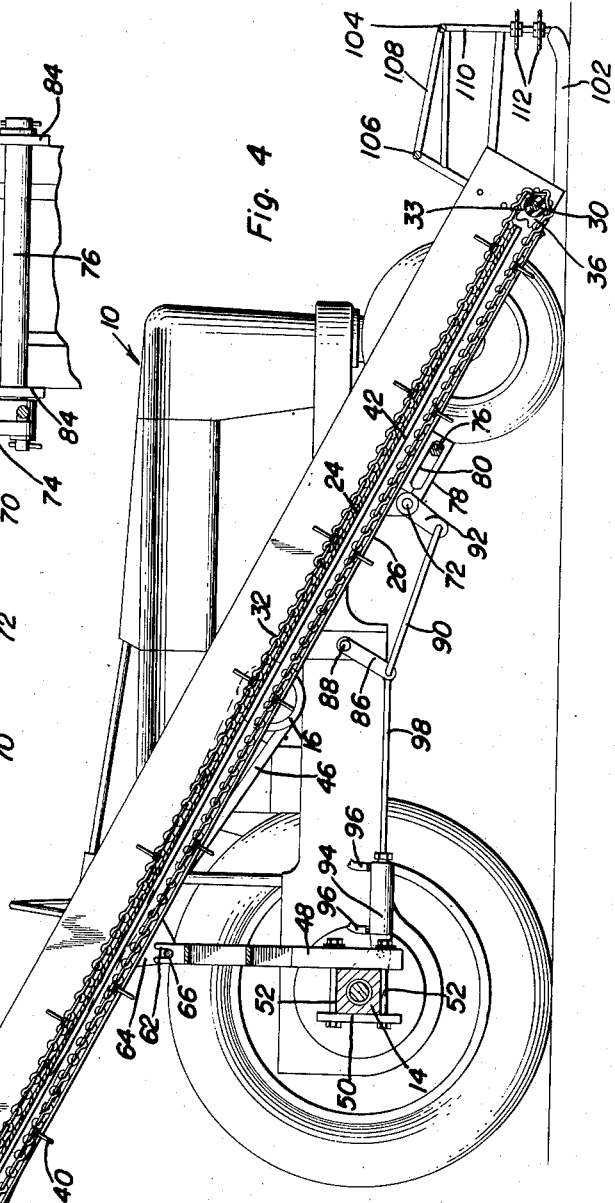

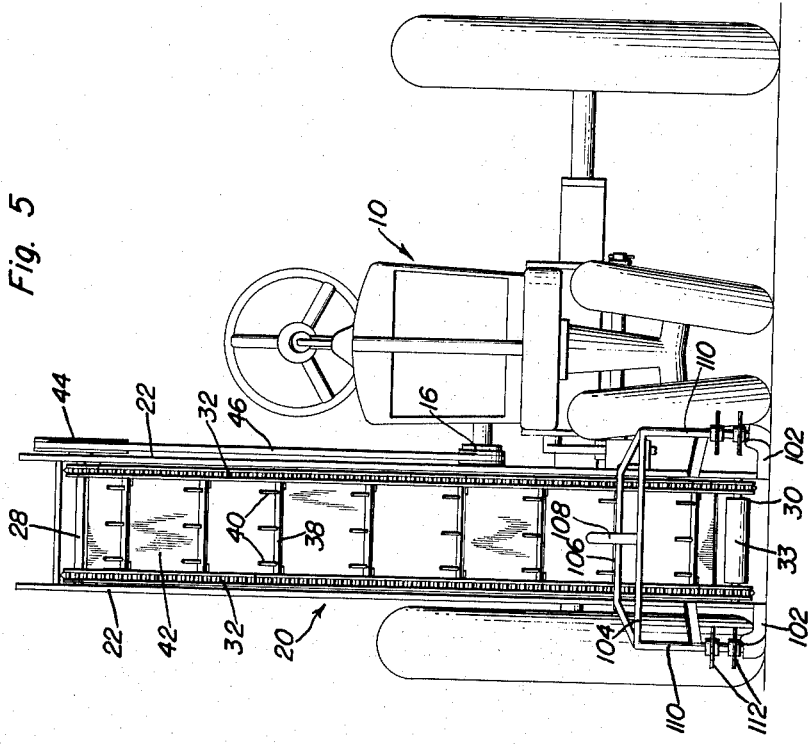
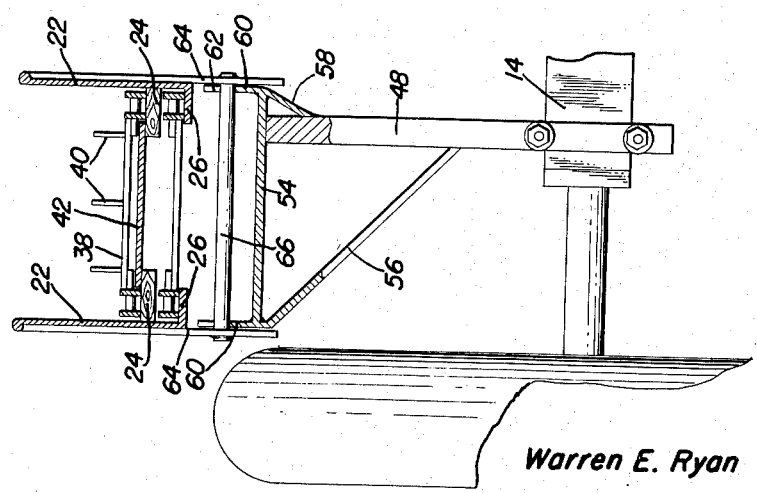
Warren E. Ryan
INVENTOR.

Patented Apr. 22, 1952

2,594,221

UNITED STATES PATENT OFFICE 2,594,221

BALE LOADER

Warren E. Ryan, Grinnell, Iowa

Application February 21, 1950, Serial No. 145,438

3 Claims. (Cl. 198—9)

This invention comprises novel and useful improvements in a bale loader and more specifically pertains to an endless conveyor type of elevating chute forming a loading attachment for mounting upon and operation by conventional farm tractors for lifting round or square bales of straw or the like from a field during travel of the tractor and loading of the bales into a wagon connected with the tractor.

The principal object of this invention is to improve and facilitate the handling and loading of square or round bales by a tractor with a minimum of labor and without interfering with the motion and maneuverability of the tractor.

A further important object of the invention is to provide an attachment in conformity with the preceding object together with improved means facilitating the application of the attachment to and the removability of the same from a tractor; for operatively connecting the attachment to the power take-off or power take-offs of a tractor; and for rendering more efficient the operation of the device in lifting bales from the ground and discharging the same into a wagon coupled to a tractor.

These, together with various ancillary features and objects of the invention which will later become apparent as the following description proceeds, are attained by the present invention, a preferred embodiment of which has been illustrated, by way of example only, in the accompanying drawings, wherein:

Figure 1 is a side elevational view showing a preferred embodiment for carrying out the principles of this invention, the elevating conveyor being indicated in its lowered and operative position for use by a tractor;

Figure 2 is a view similar to Figure 1 but showing the elevating conveyor in its raised or inoperative position for transport by the tractor;

Figure 3 is a top plan view of the embodiment illustrated in Figures 1 and 2;

Figure 4 is a vertical longitudinal sectional view through the attachment mounted upon a tractor, taken substantially upon the plane indicated by the section line 4—4 in Figure 3;

Figure 5 is a front elevational view of the device mounted upon a tractor;

Figure 6 is a fragmentary vertical transverse sectional view illustrating the manner in which the device is mounted upon a tractor for vertically pivoting movement thereon; and Figure 7 is a vertical transverse sectional view taken substantially upon the plane indicated by the section line 7—7 of Figure 1 and illustrating a portion of the mechanism for effecting a vertical tilting movement of the conveyor assembly.

Referring now more specifically to the accompanying drawings, wherein like numerals designate similar parts throughout the various views, it will be seen that there has been indicated generally at 10 a conventional form of farm tractor which is provided with the customary chassis side frame members consisting of channel beams 12, a rear axle housing 14, and a power take-off pulley 16.

The present invention comprises a power-operated endless belt or chain type of elevating conveyor assembly which is adapted to be detachably mounted as an attachment upon the tractor 10 and operated by the power take-offs of the same in an improved manner.

The elevating conveyor assembly, indicated generally by the numeral 20, is of any conventional and known construction, that indicated more particularly in Figures 6 and 7 being satisfactory for the purposes of this invention. This construction consists of side walls or plates 22 disposed in parallel relation and extending throughout substantially the entire length of the conveyor assembly, these plates having secured from their inner surfaces longitudinally extending wooden rails or the like 24 which may be attached thereto in any suitable manner, the plates terminating at the lower edges in inturned flanges 26.

As will be more readily apparent from Figure 4, a pair of axles 28 and 30 extend through the side walls 22 at the opposite ends thereof and are rotatably journaled therein, one of the axles, such as that at 28, serving as a driving axle, while the axle 30 constitutes an idler axle. Entrained over these axles is a conventional form of endless type of elevating conveyor which may conveniently consist of parallel sprocket chains 32, which may be associated with driving cogs 34 carried by the driving axle 28 and may be entrained over idler sprockets 36 carried by the idler shaft or axle 30. Extending between these chains are cross rods or panels 38 which are provided with a plurality of upstanding teeth or spikes 40. As will be more readily apparent from Figures 6 and 7, the upper flight of the endless chain conveyor rides upon the rails 24 which thus form supports for the same, while the lower flight slides upon the flanges 26, a bottom wall 42 being supported upon the upper surface of the rails 24 between the two chains to constitute a bottom for the endless conveyor.

Rotation is imparted to the driving axle 28 as by means of a driving pulley 44 which may be secured thereto as shown in Figure 5, and which is drivingly connected to the tractor power take-off pulley 16, as by a pulley belt 46.

At its upper end, the conveyor assembly side walls 22 extend beyond and upwardly of the driving pulley 44 and of the driving cogs 34 to constitute guards or shields for the same, and for preventing the bales being elevated by the conveyor from falling from the sides of the same as they are being dumped into a truck or the like, not shown, which may be coupled to and towed by the tractor.

A supporting means is provided for detachably and pivotally mounting the conveyor assembly upon the tractor. As shown best in Figures 4 and 6, this supporting means comprises a supporting standard 48 of any desired character and rising vertically from and being clamped to the rear axle 14, as by a clamp 50 and clamping bolts 52.

The upper end of the standard 48 is provided with a horizontally disposed and laterally extending supporting plate or member 54 which is rigidly secured to the standard 48 as by braces or the like 56 and 58. Rising from the opposite sides of the plate 54 are a pair of vertical supporting brackets or arms 60 which are provided with notches or apertures 62 in their upper ends, see particularly Figure 4, which constitute journals or fulcrums for pivotally supporting the conveyor assembly.

At any convenient point along their length, the conveyor side wall members 22 are provided with depending supporting brackets or plates 64, between which is mounted an axle 66 disposed beneath the conveyor and extending transversely thereof. This axle is adapted to be received within and to be removed vertically from the support bracket notches 64, and constitutes a fulcrum for pivotally supporting the conveyor intermediate its ends upon the supporting standard 48. It will now be seen that the conveyor assembly is retained merely by gravity or its own weight in the journaling notches of the support standard, although if desired a clamping or retaining means might be provided to prevent accidental or unintentional withdrawal of the pivoting axle 66 from these supporting journals.

This pivotal mounting of the conveyor assembly is necessary, since the lower end of the same is intended to slide upon the surface of the ground in order to engage and elevate bales therefrom for loading the bales into a wagon or the like. As will be readily seen, irregularities in the ground contour will necessarily impart variable tilting movement to the conveyor assembly.

An operating means is provided for effecting a positive tilting movement of the conveyor about its support axle 66 in order to selectively move the conveyor from its operative or lowered position shown in Figure 1 to a raised or inoperative position shown in Figure 2, the latter position being desirable when it is necessary to move the tractor and the conveyor while not utilizing the elevating function of the same. It is evident that suitable, manually operated means can be provided to effect the desired tilting movement of the conveyor assembly. However, it is preferred to employ the power operated means illustrated in the annexed drawings. For this purpose, and as shown best in Figures 4 and 7, a pair of depending brackets 68 are suitably rigidly attached to the chassis frame members 12 of the tractor, and are provided with journals 70 for rotatably receiving therebetween a crank arm 72 provided with a lever arm 74 at its outer end. It will thus be seen that the crank 72 is journaled beneath and transversely of the tractor chassis or frame, with the crank arm 74 thereof being disposed upon the outside of and below said frame. The crank arm 74 is provided with a laterally and outwardly extending crank pin 76 which is slidably received in guide members 78 in the form of brackets secured to and depending from the side walls 22 of the conveyor assembly. These guides 78 include elongated slots 80 which slidably receive and retain the crank pin 76 therein, two of these guide brackets 78 being provided, one upon each side of the conveyor assembly, as shown in Figure 7.

Preferably, although not necessarily, the guides 78 include upper members 82 and lower members 84, the adjacent surfaces of these two members being provided with complementary notches or recesses to form the above-mentioned elongated slot 80 therebetween, the members 82 and 84 being conveniently hinged to each other at one end, and being releasably secured to each other at their opposite ends in any desired manner. This construction permits and facilitates the insertion of the crank pin 76 into the guide slots 80, and its removal therefrom, thereby effecting a ready removability of and application of the device to a tractor.

It will now be seen that upon a rocking movement of the crank shaft 72, the crank pin 76 thereof will move in the slots 80 in the manner suggested in Figures 1 and 2, thereby raising or lowering the lower end of the conveyor assembly and causing the above-mentioned pivotal tilting movement of the conveyor about its fulcrum.

While this rocking movement of the crank shaft 72 could readily be effected by manually operated means, it is preferred to employ the conventional hydraulic power take-off mechanism of a tractor to effect this purpose. Accordingly, a link or lever 86 is pivoted as at one end at 88 to any convenient portion of the tractor framework, and is pivotally connected at its other end to one extremity of a connecting link 90 whose other end is pivoted to a crank arm 92 fixedly secured to the crank shaft 72. A conventional form of hydraulically operated cylinder and piston, the same being indicated generally at 94, is suitably mounted upon the chassis or framework of the tractor, and is coupled to the hydraulic power take-off of the tractor, as by detachable conduits 96, in a conventional manner well understood in the art. The piston of the hydraulic cylinder, not shown, is connected as by a piston rod 98 to the end of the lever 86, so that upon reciprocation of the hydraulic piston within the hydraulic cylinder 94, the lever 86, the arm 92, the crank shaft 72, crank arm 74 and crank pin 76 may be rocked to selectively raise or lower the lower end of the conveyor assembly.

Since it is contemplated and intended that the lower end of the conveyor assembly shall rest upon the ground as the tractor moves forward, means are provided for supporting this lower end of the conveyor assembly as well as for feeding and guiding bales upon the conveyor belt. This feeding and guiding means consists of a flaring, funnel-shaped guideway having forwardly and outwardly inclined side walls which may conveniently comprise an open bar or grille assembly, indicated generally by the numeral 100, these side walls being provided with conventional forms of shoes 102 for supporting the same and the lower end of the conveyor assembly upon the surface of the ground for sliding movement thereover.

This guiding assembly, as shown in Figures 3 and 5, may be strengthened by transversely disposed bars 104 and 106 at the top thereof, and by a longitudinally extending medial guide strip 108 extending between the mid portions of the bars 104 and 106. As will now be seen from Figures 4 and 5, and opening is provided whereby bales of straw or the like disposed upon the ground will pass beneath the top bars 104, 106 and 108 and between the side walls of the guide during forward movement of the tractor and to the conveyor assembly, until they are engaged by the conveyor chain, whereupon they will be lifted upwardly, passing beneath the bar 106 and the bar 108, to be discharged into a wagon, as set forth hereinbefore. Conveniently, the side walls may be provided with vertical rods 110 at their forward ends, upon which are journaled any desired number of star wheels 112 whose teeth thus extend across the front of the side walls of the guideway and between the same. These teeth serve to engage or grip the bales and insure the passage of the same between the side walls of the guide means, in a manner which will now be apparent.

Between the side walls 22 and the sprocket chains 32, the axle 30 has a rubber drum or roller 33 secured thereto. The sprocket chains thus serve to revolve the drum roller 33 which assists in lifting the bales, guided thereto by the assembly 100, onto the conveyor.

From the foregoing, the construction and operation of the device, together with its many advantages, will be readily understood, and further explanation is believed to be unnecessary. However, it is to be clearly understood that the principles of this invention are not limited to the actual construction shown and described, since all suitable modifications and equivalents may be resorted to, falling within the scope of the appended claims.

Having thus disclosed and described the invention, what is claimed as new is as follows:

1. A bale loader for tractors comprising an endless elevating conveyor, means supporting said conveyor upon a tractor for vertical pivoting movement, means for tilting said conveyor vertically about said support means, operating means for driving said conveyor from the power take-off of a tractor, means for supporting one end of said conveyor upon the ground, feeding means for directing material upon the lower end of said conveyor, said tilting means including a lever journaled on said tractor, a guide on said conveyor, an arm on said lever slidably received in said guide, means for rocking said lever, said guide comprising a pair of hinged members complementarily recessed to form a slot therebetween.

2. A bale loader to be mounted on and driven by a tractor comprising a conveyor assembly including a pair of side plates disposed in spaced apart parallel relation, said plates terminating in inturned angles at the lower edge, inwardly directed rails on said plates intermediate the edges of said plaes, a pair of suporting brackets mounted on the opposed plates intermediate the ends thereof, an axle mounted in said brackets, said axle being disposed below and transverse to said side plates, a supporting standard mounted on the tractor, a laterally extending supporting plate rigidly secured on said standard, a pair of vertical supporting arms on the opposite sides of the supporting plate, journaling notches in the upper ends of said arms, said axle being received in said notches.

3. A bale loader to be mounted on and driven by a tractor comprising a conveyor assembly including a pair of side plates disposed in spaced apart parallel relation, said plates terminating in inturned angles at the lower edge, inwardly directed rails on said plates intermediate the edges of said plates, means for supporting said conveyor on said tractor, axles journaled between said side plates at the opposite ends thereof, a pair of sprocket wheels on each of said axles, a pair of parallel, endless sprocket chains entrained over said sprocket wheel, a plurality of rods extending between said parallel sprocket chains, the upper flight of said chains riding on said rails, the lower flight of said chains riding on said inturned angles, a bottom wall supported on said rails between said chains, feeding and guiding means including a funnel-shaped guideway having forwardly and outwardly inclined side walls, shoe supporting said guide walls and the lower end of the conveyor, vertical rods at the forward ends of said side walls, star wheels journaled on said rods.

WARREN E. RYAN.

REFERENCES CITED

The following references are of record in the file of this patent:

UNITED STATES PATENTS

| Number | Name | Date |
|---|---|---|
| 985,991 | Fiebach | Mar. 7, 1911 |
| 2,317,644 | Russell | Apr. 27, 1943 |
| 2,335,924 | Elholm | Dec. 7, 1943 |
| 2,397,570 | Smoker | Apr. 2, 1946 |
| 2,400,086 | Hansen | May 14, 1946 |
| 2,409,143 | McElhinney | Oct. 8, 1946 |
| 2,427,324 | Farr | Sept. 9, 1947 |